(12) United States Patent
Naito (10) Patent No.: US 10,980,186 B1
(45) Date of Patent: Apr. 20, 2021

(54) ARTIFICIAL LIGHTING DEVICE AND POWER SUPPLY METHOD THEREFOR

(71) Applicant: MICRO COATEC CO., LTD., Ashiya (JP)

(72) Inventor: Sousuke Naito, Hyogo (JP)

(73) Assignee: MICRO COATEC CO., LTD., Hyogo (JP)

( * ) Notice: Subject to any disclaimer, the term of this patent is extended or adjusted under 35 U.S.C. 154(b) by 0 days.

(21) Appl. No.: 16/630,335

(22) PCT Filed: Mar. 29, 2018

(86) PCT No.: PCT/JP2018/013206
§ 371 (c)(1),
(2) Date: Feb. 20, 2020

(87) PCT Pub. No.: WO2019/012753
PCT Pub. Date: Jan. 17, 2019

(30) Foreign Application Priority Data

Jul. 11, 2017 (JP) .............................. JP2017-135388

(51) Int. Cl.
*A01G 7/04* (2006.01)
*A01G 9/24* (2006.01)
(Continued)

(52) U.S. Cl.
CPC .............. *A01G 7/045* (2013.01); *A01G 9/249* (2019.05); *H05B 45/36* (2020.01); *H05B 45/37* (2020.01); *H05B 47/16* (2020.01)

(58) Field of Classification Search
None
See application file for complete search history.

(56) References Cited

U.S. PATENT DOCUMENTS

| 2011/0234106 A1* | 9/2011 | Wang | H05B 45/39 |
| | | | 315/137 |
| 2013/0207562 A1* | 8/2013 | Zhang | H02M 7/23 |
| | | | 315/201 |

(Continued)

FOREIGN PATENT DOCUMENTS

| JP | H03-253262 | 11/1991 |
| JP | 2007-174723 | 7/2007 |
| JP | 2014-207190 | 10/2014 |

OTHER PUBLICATIONS

International Search Report of PCT/JP2018/013206, dated Jun. 19, 2018, 4 pages with English translation.
(Continued)

*Primary Examiner* — Anh Q Tran
(74) *Attorney, Agent, or Firm* — Hamre, Schumann, Mueller & Larson, P.C.

(57) ABSTRACT

[Problem] To provide an artificial lighting device capable of suppressing harmonics with a structure including only a linear load without use of a switching element and stopping inrush current while preventing a reduction in power factor by omitting a smoothing capacitor.
[Solution] An artificial lighting device comprise: multiple LED elements (200); an input division unit (110) for dividing a three phase power supplied from a three-phase AC power supply (300) into each input to U, V, W; a full-wave rectifier (120) for performing full-wave rectification on the divided input; a single phasing unit (130) for creating a single phased output by superimposing the outputs subjected to the full-wave rectification; and a single phased power supply (140) for providing the LED elements (200) with the output from the single phasing unit (130) as a power supply. Given that inductance components and capacitance components integrated by the entire large-scale LED illumination device assembly (2009 are used as a pseudo-LC filter, (Continued)

harmonics resulting in noise can be suppressed to thereby improve power factor via a feedback loop from the input stage of the input division unit (110) toward the large-scale LED illumination device assembly (200).

6 Claims, 8 Drawing Sheets

(51) Int. Cl.
    *H05B 45/36*     (2020.01)
    *H05B 45/37*     (2020.01)
    *H05B 47/16*     (2020.01)

(56) References Cited

U.S. PATENT DOCUMENTS

2015/0084516 A1\*    3/2015    Chu ................. H05B 45/395
                                                                              315/140
2017/0231049 A1\*    8/2017    Clawson, Jr. .......... H02M 1/14

OTHER PUBLICATIONS

"Switching power supply that revolutionized the power supply," TDK Techno Magazine, 2008, 7 pages including Machine translation, Original available at: http://www.tdk.co.jp/techmag/power/200807/.

\* cited by examiner

ARTIFICIAL LIGHTING DEVICE AND POWER SUPPLY METHOD THEREFOR

TECHNICAL FIELD

The present invention relates to an artificial lighting device used for a facility such as a factory requiring a large-scale lighting system. A light source for artificial lighting is not limited to a LED element, and other light sources can be employed. When applied to buildings for plant growing, the cultivatable plant is not limited as long as it is suitable for growth with light coming from the artificial lighting device.

The present invention also relates to an artificial lighting device used for general factories and offices. A light source for artificial lighting is also not limited to a LED element, and other light sources can be employed.

BACKGROUND ART

Development of High-power LED (Light Emitting Diode) elements proceeds, and a so-called LED lighting device has become widely used instead of a conventional white light bulb device and a conventional fluorescent light device. Especially, a white LED element can emit various wavelength light different from a conventional monochromatic LED that only can emit monochromatic light, and the white LED element is suitable for a lighting for living use and industrial use. In addition, due to its excellent feature of compact size, energy saving and long-life, the LED element becomes widespread.

The LED element is widely used as an artificial light source of the artificial lighting device. For example, it is beginning to be applied as an artificial source of artificial lighting device for growing plants. The LED element is expected as one of the suitable light sources for plant cultivation because it can emit artificially the required light wavelength for plant photosynthesis.

In addition to the artificial lighting, plants are cultivated under an appropriately controlled temperature, humidity and air conditioning in the plant growing facility. Therefore, the plant can be cultivated with organic ingredients stably without being affected by weather and insects. Since the plant growing facility lighting is using only artificial lighting without any use of sunlight, unlike facilities that use the outside light, such as greenhouses, there is no weather influence. The plant growing facility can produce vegetables in a manner like manufactured goods, so it may be called "a plant factory".

As an artificial light source used for a plant factory, a tubular-shape LED lighting tube equipped with a large-scale number of LED elements is employed, and a large number of such LED lighting tubes are arranged to supply required artificial lighting.

In the operation of a plant factory, it is important to reduce the procurement cost and installation cost of the LED lighting device, and to achieve a lower power supply cost.

The general common method for electric power supply for a general common LED lighting device is described below.

For the electric power supply to the general factories and offices, commercial electric power supply is commonly used. Commercial electric power source supplies frequency at 100V is 50 Hz (East Japan) or 60 Hz (West Japan). However, the LED element itself is a semiconductor element, driven by a direct current of about 3.5 V to 5V. Therefore, the electric power supply circuit is required to obtain a suitable power supply for LED element drive. The electric power supply circuit for a voltage drop and AD conversion is necessary to obtain 3.5 V to 5V DC from the commercial electric power supply of 100V AC.

In the prior art, such electric power supply circuits for LED element driving are generally a linear type electric power supply circuit or a switching type electric power supply circuit.

First, the conventional linear type electric power supply circuit is explained.

Figure 7:
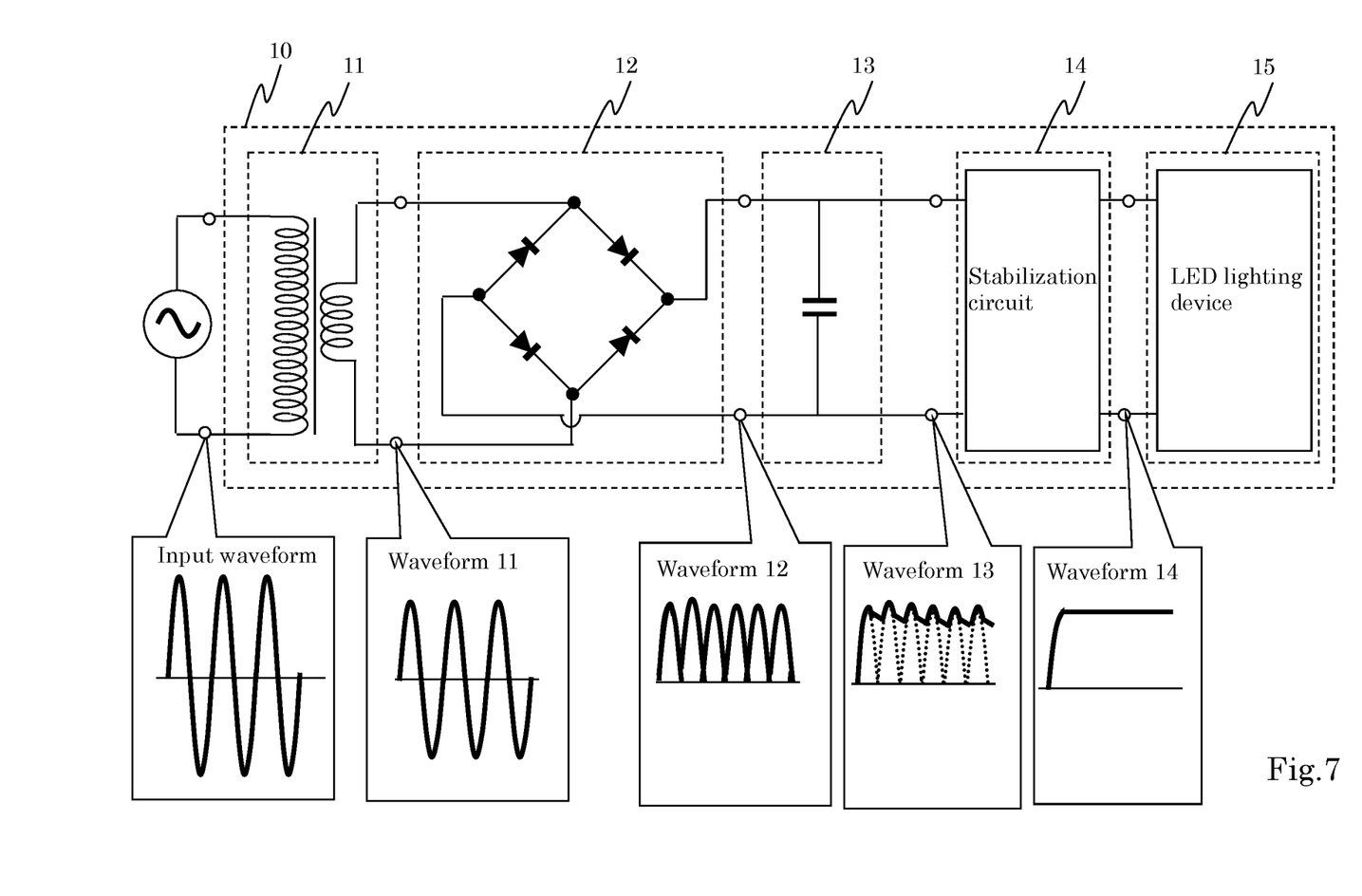
FIG. 7 is a schematic view showing the conventional artificial lighting device 10 of the conventional linear type electric power supply circuit.

A linear type electric power supply circuit 10 is a general electric power supply circuit as shown in FIG. 7.

As shown in FIG. 7, the input electric power supply is a commercial power supply of AC 100V.

The input voltage of the commercial electric power supply is subjected to a voltage drop process to about 5V via the voltage transformer 11. In this way, transformer 11 performs voltage drop in AC-AC at first process.

Then dropped voltage by the voltage transformer 11 is input to a full wave rectifier diode bridge circuit 12, the electric power voltage is converted AC-DC as pulsating voltage flow.

In the full-wave rectifier diode bridge circuit 12, a voltage that is a rectified pulsating current is smoothed by the charge-discharge operation of the smoothing capacitor 13. The voltage after the smoothing capacitor 13 does not become completely stabilized DC because it contains the ripple, and it can be called a non-stabilized direct current (ripple direct current).

The output of the smoothing capacitor 13 is further smoothed by the stabilization circuit 14 such as a chopper coil and the rectifier diode, it becomes good quality of a stable flat DC electric power 3.5 V to 5V.

As shown above, the linear type electric power supply circuit is composed of several parts.

Next, a conventional switching type electric power supply circuit is described below.

Figure 8:
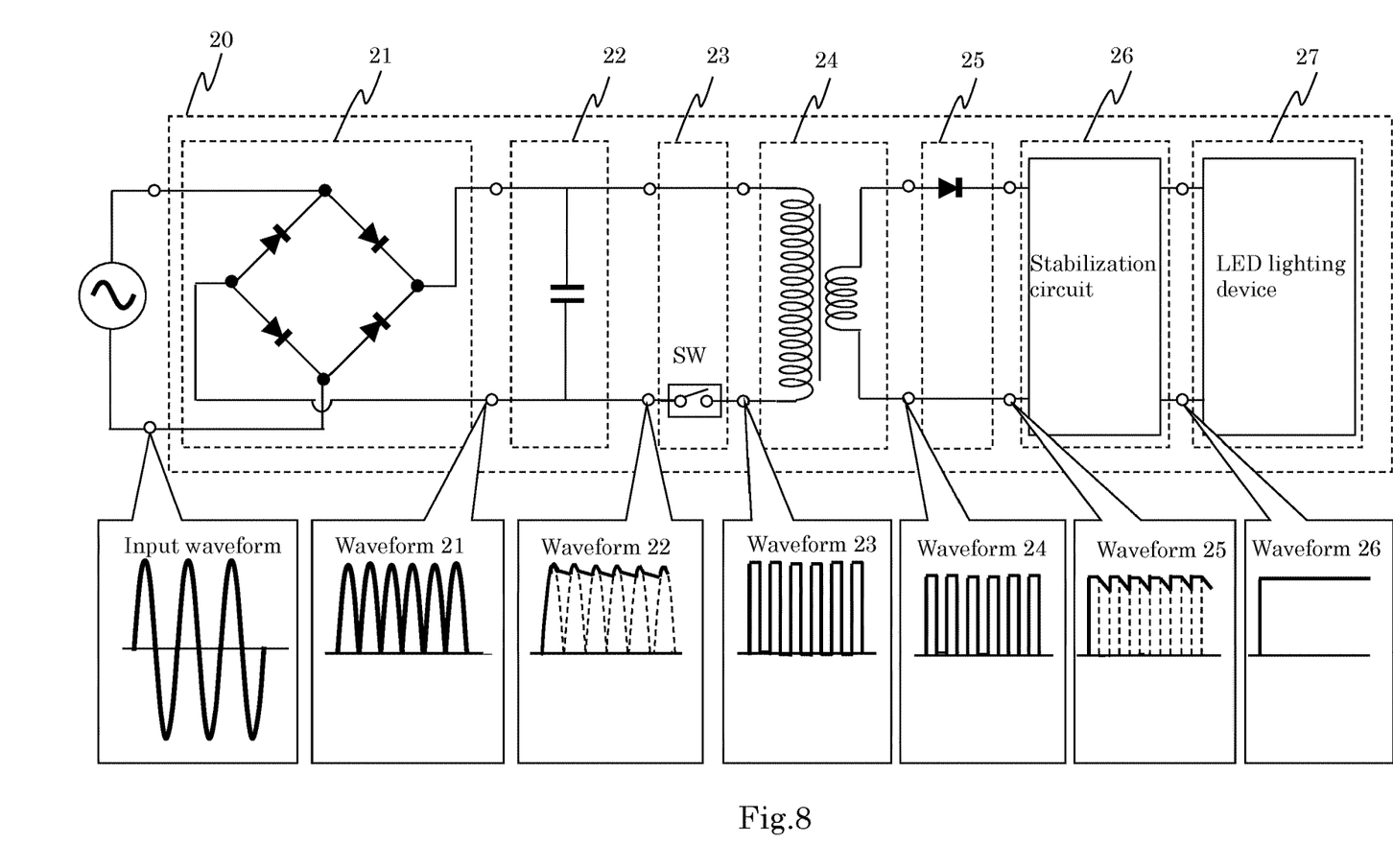
FIG. 8 is a schematic view showing the conventional artificial lighting device 20 of the conventional switching type electric power supply circuit.

A conventional switching type electric power supply circuit 20 is a conventional power source circuit shown in FIG. 8.

The conventional switching type electric power supply circuit 20 does not employ the large wire-wound transformer such as that of the linear type electric power supply circuit 10, and it becomes relatively compact. This is one merit of this type.

The input electric power supply is a commercial power supply of AC 100V the same as that of the linear type electric power supply circuit 10. In the case of the conventional switching type electric power supply circuit 20, an input voltage of the commercial electric power supply at 100V is input to a full wave rectifier diode bridge circuit 21 for the first process. In the case of the above-mentioned linear type electric power supply circuit 10, voltage drop process to about 5V by the voltage transformer 11 is executed at the first process. However, in the case of the conventional switching type electric power supply circuit 20, AC-DC electric power voltage conversion is executed by the full-wave rectifier diode bridge circuit 21 at a high voltage range as it is at the first process. Therefore, a high withstand voltage diode (about 140 V) is required for the diode bridge circuit employed in the full-wave rectifier diode bridge circuit 21.

In the full-wave rectifier diode bridge circuit 21, a voltage that is rectified pulsating current is smoothed by the charge-discharge effect of the smoothing capacitor 22. Therefore, a high withstand voltage diode is also required for the smoothing capacitor. The voltage after the smoothing capacitor 22 does not become completely stabilized DC because it contains the ripple (ripple direct current).

The conventional switching type electric power supply circuit 20 obtains ON/OFF waveform as output via the high-frequency transformer 24 for DC-AC conversion by chopping (cutting) the high DC voltage by the switching operation of the switching element 23.

In this ON/OFF frequency, i.e. the switching frequency becomes a high frequency significantly several tens of kHz get further higher than that of the original input AC 50 Hz/60 Hz.

This high frequency AC voltage obtained via the high-frequency transformer 24 is converted to a pulsating low voltage flow by being rectified by the rectifier diode circuit 25.

In the rectifier diode 25, the voltage rectified into pulsating current is smoothed by the charge-discharge operation of the smoothing capacitor (not shown in FIG. 8). However, the voltage after the smoothing capacitor (not shown in FIG. 8) does not become completely stabilized DC because it contains the ripple (ripple direct current).

Finally, the output of the smoothing capacitor (not shown in FIG. 8) becomes good quality flat DC power of 3.5 V to 5V via the stabilization circuit 26 by a chopper coil and the rectifier diode.

That is, the conventional switching type electric power supply circuit 20 uses a complex operation such as a high voltage AC-high voltage DC conversion by the full-wave rectifier diode bridge circuit 21, the high voltage DC-high voltage AC conversion by switching operation of the switching element in the high-frequency transformer 24, and high voltage AC-low voltage AC conversion by the high-frequency transformer 24.

Prior art: Non-patent document http://www.tdk.co.jp/tech-mag/power/200807/ TDK. Co. JP

DISCLOSURE OF THE INVENTION

The Problems to be Solved

However, there is a problem in the electric power supply circuit for LED element driving of the conventional artificial lighting.

As a first problem of the linear type electric power supply circuit 10, there is a problem that the scale of the power supply circuit becomes large.

The linear type electric power supply circuit 10 is a winding type transformer device, which is adjusted to a conversion transformer 12 for converting high-voltage AC to the constant voltage AC. Therefore, the size and weight of the apparatus becomes large. Also, the smoothing capacitor 13 has to be added as an essential electronic element in order to reduce ripple. Conventionally, the circuits for power supply to the LED elements such as the conversion transformer 12 and the smoothing capacitor 13 are designed in each LED lighting device independently for supplying good quality voltage supply to each LED lighting device independently, and the circuits for power supply become large. There is no macro viewpoint capturing the power supply to several thousand to several million LED lighting apparatus as a whole.

As a second problem of the linear type electric power supply circuit 10, there is a problem of the inrush current. When using the smoothing capacitor 13 for smoothing the ripple waveform, the smoothing capacitor 13 having a large capacity is required. Therefore, the inrush current for charging the smoothing capacitor 13 is generated at the time of start-up.

As a first problem of the switching type electric power supply circuit 20, there is a noise problem. Noise is generated in the switching type electric power supply circuit by repeating the ON/OFF switching at a high speed, i.e. the frequency of several tens kHz. Without a noise suppression measure, the noise becomes an obstacle for the driving of the LED elements and an error has occurred. Furthermore, even element breakdown may occur. As a result, the number of parts for noise suppression measure becomes large, the scale of the device becomes large, and the cost increases.

As a second problem of the switching type power supply circuit 20, there is a problem of power factor decrease. The switching type power supply circuit 20 employs two smoothing capacitors. The one is the smoothing capacitor 22 for ripple reduction at high voltage range, the other is the smoothing capacitor 26 for the ripple reduction at low voltage range. The power factor falls by the phase shift due to the presence of these capacitance components.

As a third problem of the switching type power supply circuit 20, there is a problem of harmonic generation. The switching type power supply circuit 20 includes a lot of harmonic nonlinear elements that can be a source of harmonics. Harmonics, especially the third harmonics is superimposed to the waveform, element breakdown may occur due to overvoltage. As a result, the number of parts for noise suppression measure such as the rectifier diode circuit 25 and the stabilization circuit 26 becomes large, the scale of the device becomes large, and the cost increases.

As a fourth problem in the switching type power supply circuit 20, cost reduction is difficult due to the large number of components. The switching type power supply circuit 20 employs many parts for operating a high voltage AC-high voltage DC conversion by the diode bridge, the high voltage DC-high voltage AC conversion by switching and the high voltage AC-low voltage AC conversion by the high-frequency transformer.

Further, as described in the prior art, the power supply to the LED elements is designed in each LED lighting device independently for supplying good quality voltage supply to each LED lighting device independently, and there is no macro viewpoint capturing the power supply as a whole.

In order to solve the above problems, the object of the present invention is to provide an artificial lighting device and a control method with a small number of components, that employs only a linear load without any switching element for suppressing noise generation and harmonic generation, and skips a smoothing capacitor for preventing deterioration of power factor due to the inrush current.

Means for Solving the Problems

In order to achieve the above-mentioned object, the present invention of an artificial lighting device applied to a plant factory comprises an LED lighting device having a plurality of LED elements, an input division unit for dividing three-phase power supplied from a three-phase AC power supply to each U, V, W input power source, a full-wave rectifier for performing full-wave rectification for each input power source divided by the input division unit, a single-phase unit for superimposing each full-wave rectified output by the full-wave rectifiers as a single-phase power source for the LED lighting device, and a loop circuit for feeding back from the LED lighting device assembly to the input stage of the input division part or the full-wave rectifier.

According to the above configuration, the artificial lighting device of the present invention is formed by a small number of parts and becomes small-scale. By only employing a linear load without using a switching element, it is possible to suppress noise and harmonics, and prevent inrush current by omitting the installing of a smoothing capacitor and improve the power factor as a whole.

In the present invention of an artificial lighting device, the LED lighting device assembly is a large-scale LED lighting device assembly, and a small inductance component and a small capacitance component in each LED lighting device are accumulated to work as a pseudo LC filter by the large-scale LED lighting device assembly as a whole. The loop circuit for feeding back from the LED lighting device assembly to the input stage of the input division part or the full-wave rectifier can utilize this pseudo LC filter.

According to the above configuration, the artificial lighting device of the present invention can obtain such a pseudo LC filter by accumulating a small inductance component and a small capacitance component in each LED lighting device. As a result, harmonics shown in the power supply waveform supplied from the three-phase to single-phase converted power source can be suppressed, and the power factor can be improved.

According to the above configuration, the artificial lighting device of the present invention can improve the power factor and is formed by a small number of parts with small cost and becomes small-scale.

The present invention of an artificial lighting device can further comprise a smoothing capacitor at the output stage of the full-wave rectifier and at the input stage of the single-phase unit. According to the above configuration, the ripple in the power waveform is suppressed by the smoothing capacitor.

In this configuration, the artificial lighting device of the present invention can obtain a pseudo LC filter the same as above by accumulating a small inductance component and a small capacitance component in each LED lighting device, The loop circuit for feeding back from the LED lighting device assembly to the input stage of the input division part or the full-wave rectifier can utilize this pseudo LC filter.

Since the input power source is a three-phase AC power source, the artificial lighting device of the present invention can share the input power source with other induction type electric apparatus used in the same factory. It is possible to reduce the number of parts for input power source by sharing the input power source, and the artificial lighting device of the present invention can reduce the costs.

When applied to a plant factory, it is preferable that the artificial lighting device of the present invention further comprises a lighting controller such that the LED element is controlled to be turned on in a time period simulating the daytime, and to be turned off in a time period simulating the night.

According to the above configuration, the artificial lighting device of the present invention can simulate the day and night for growing the plants.

Effect of the Invention

According to the present invention, the artificial lighting device only employs a linear load without using a switching element, it is possible to suppress the generated harmonics and improve the power factor as a whole.

Further, according to the present invention of the artificial lighting device, it is possible to reduce the number of parts, cost and scale.

DETAILED DESCRIPTION OF THE PREFERRED EMBODIMENT

Some embodiments of an artificial lighting device according to the present invention are described below with reference to the relevant drawing. Needless to add, the claims of the present invention include but are not limited to the application, configuration, or quantity shown in the following embodiments.

Embodiment 1

The artificial lighting device 100 in Embodiment 1 according to the present invention is described.

Figure 1:
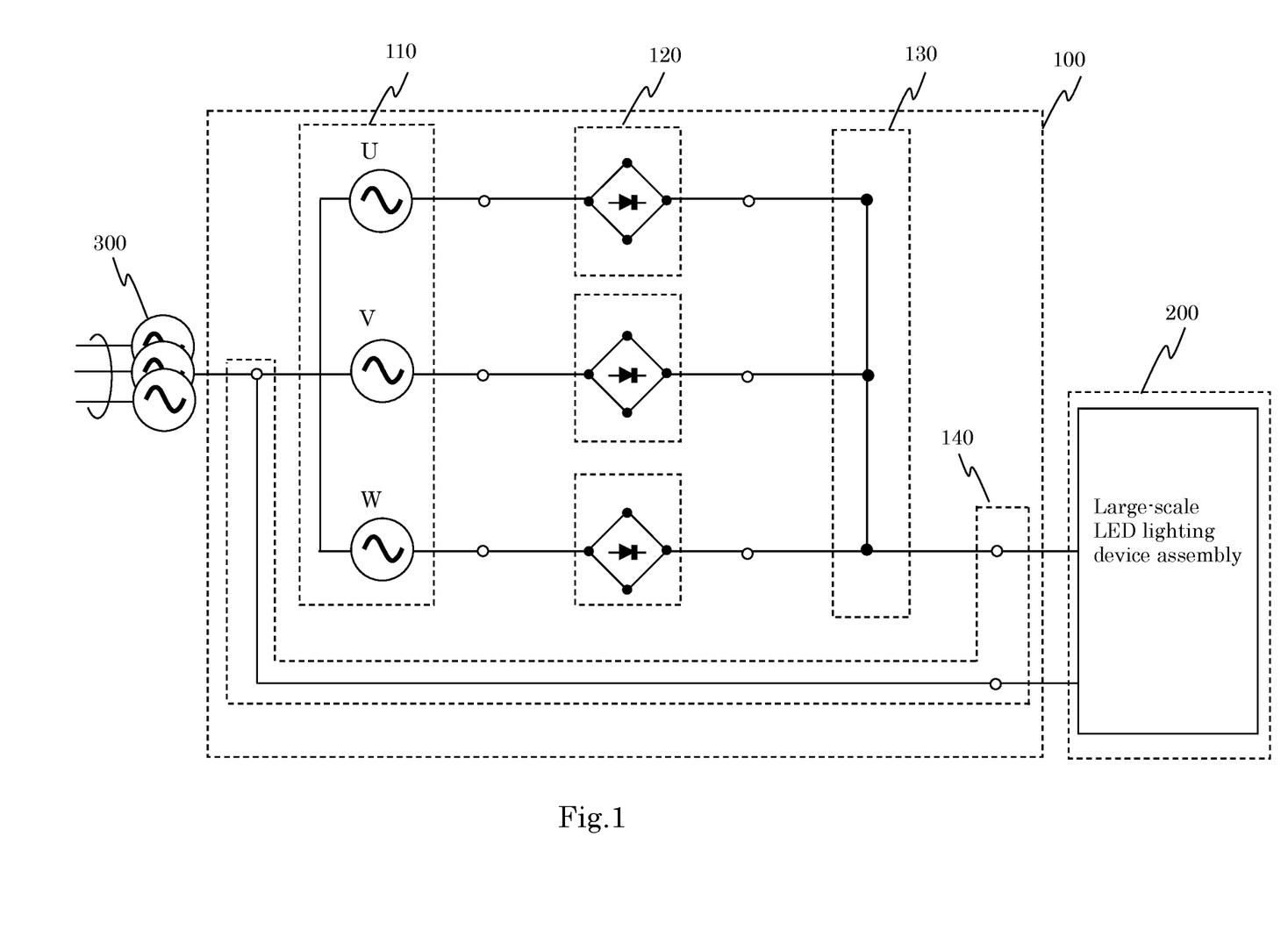
FIG. 1 is a schematic view of the structure of the artificial lighting device 100 of the Embodiment 1.

FIG. 1 is a schematic view of the structure of the artificial lighting device 100 of the Embodiment 1.

Figure 2:
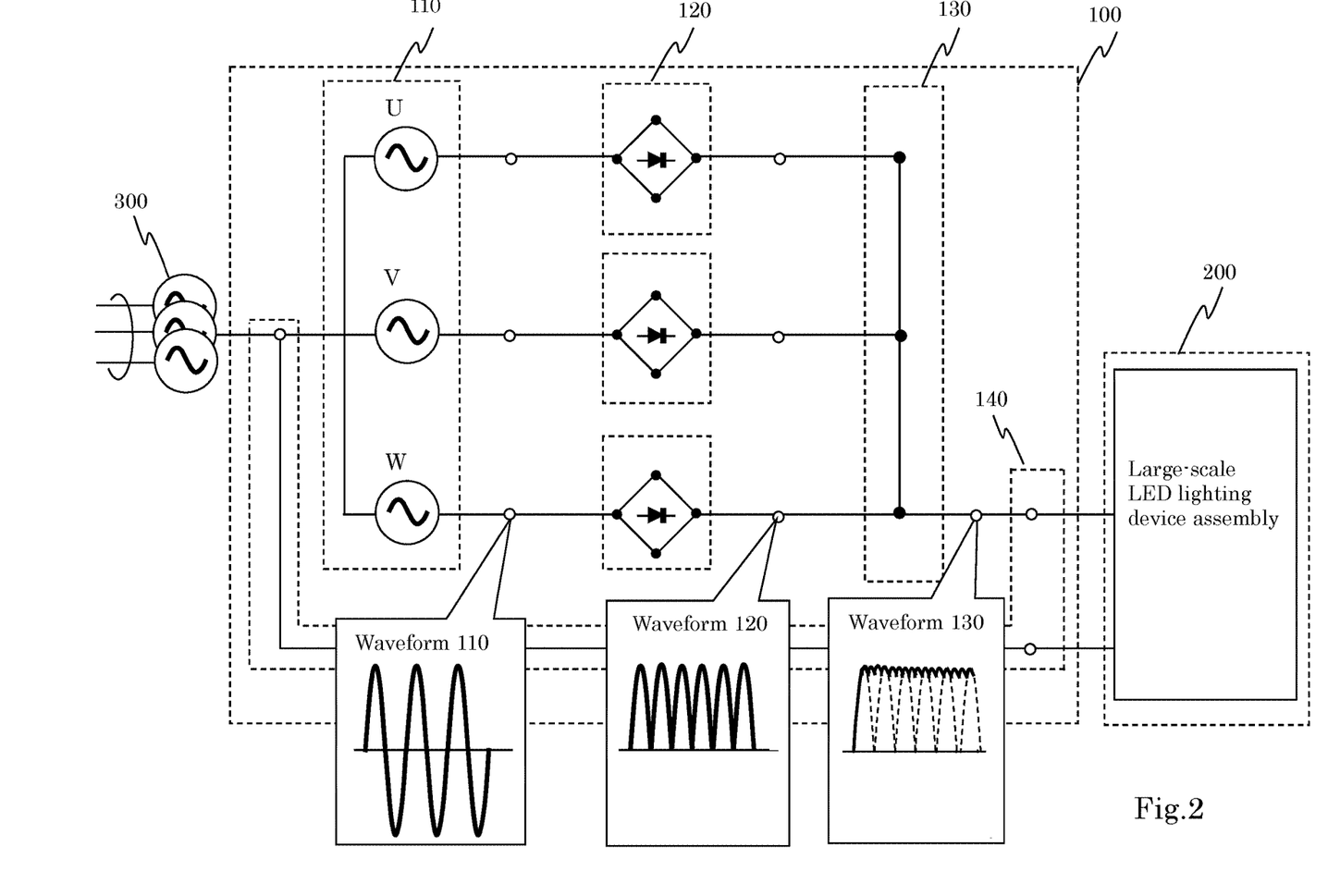
FIG. 2 is a schematic view showing input and output waveforms of the respective portions in the circuit shown in FIG. 1.

FIG. 2 is a schematic view showing input and output waveforms of the respective portions in the circuit.

Figure 3:
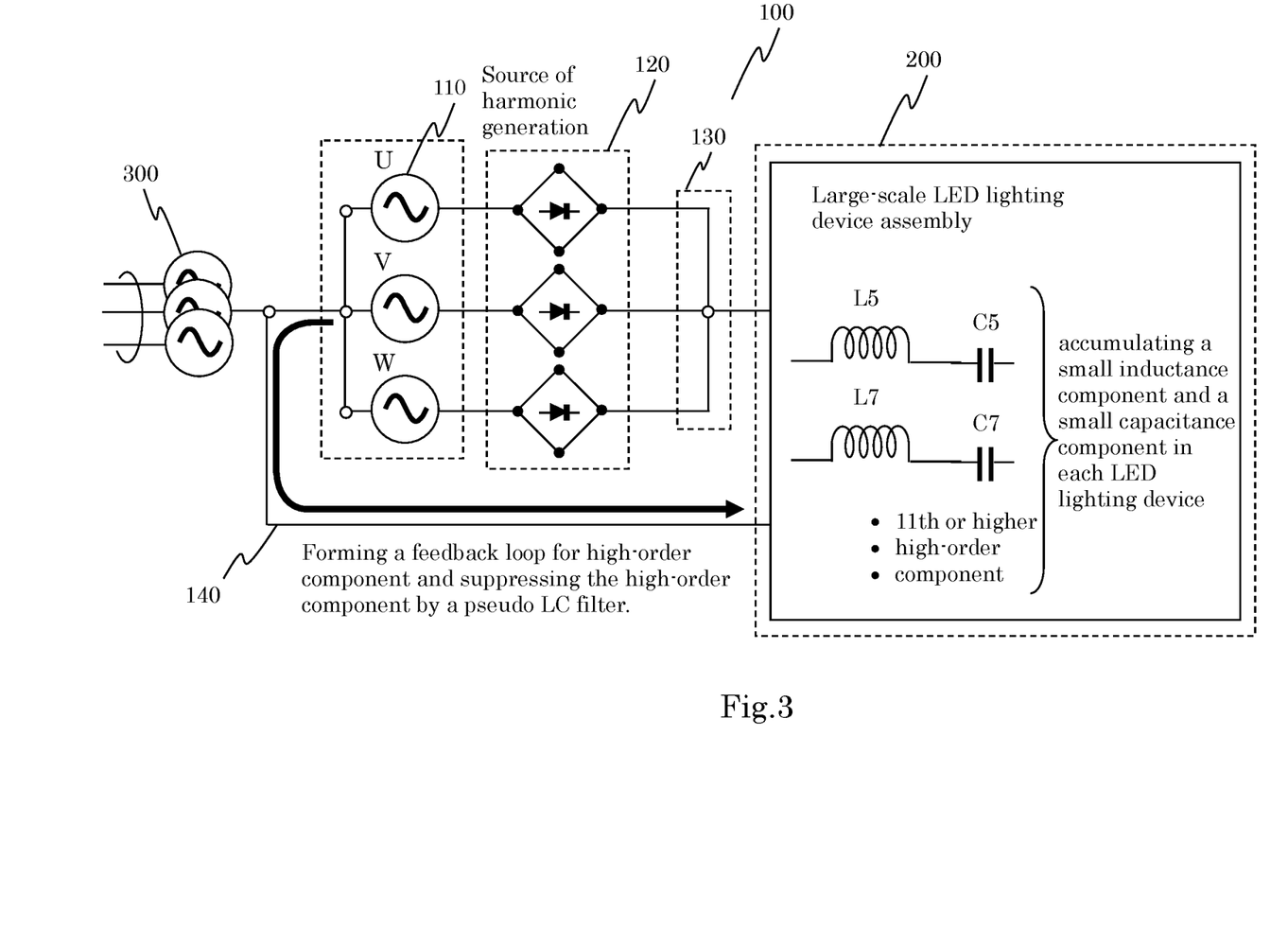
FIG. 3 is a schematic view showing a feedback current by a feedback loop in the configuration of the Embodiment 1.

FIG. 3 is a schematic view showing a feedback current by a feedback loop.

As shown in FIG. 1, the artificial lighting device 100 according to Embodiment 1 comprises an input division unit 110, a full-wave rectifier 120, a single-phase unit 130, and a single-phase power supply unit 140. It can be understood that any switching power source is not employed. As shown in FIG. 1, the input stage includes a commercial three-phase AC power supply 300, and the output stage includes a large-scale LED lighting device assembly 200.

Each component is described below.

A commercial three-phase AC power supply 300 is a commercial three-phase AC power supply, such as a 100 V power source. Since it is a three-phase AC power source, input lines of each phase of u, v, and w are supplied independently and these are twisted together.

The input division unit 110 divides three-phase power supplied from a three-phase AC power supply 300 into input of each U, V and W. As shown in FIG. 1, a commercial three-phase AC power supply 300 is divided into three input voltages U, V, and W by an input division unit 110.

Output of the waveform 110 of the input division unit 110 drawn in the lower portion of FIG. 2 is the W-phase waveform. It is the form of a sine wave at a range of −100 V to 100 V. The W-phase waveform and the other U-phase waveform and the V-phase waveform are shifted by 120 degrees from each other, respectively.

The input dividing unit 110 divides each other three U, V, W voltages, and outputs the same to the full-wave rectifier 120 in the next stage.

The full-wave rectifier 120 receives an AC waveform and performs full-wave rectification. It rectifies the input by turning the negative portion of the AC waveform to positive. For example, the full-wave rectifier 120 may be a full-wave rectifier diode bridge circuit.

In this example, each input of u, v, w, which divided by the input division section 110 and voltage-dropped by a transformer 120 is rectified in the full-wave range individually by the full-wave rectifier 120.

The waveform 120 of the output of the full-wave rectifier 120 drawn in the lower portion of FIG. 2 is the w-phase waveform. Each wave is a part of a sine waveform, but each waveform is a rectified pulse flow from a sine wave which has a range of 0V to 100V. The W-phase waveform and the other U-phase waveform and the V-phase waveform are shifted by 120 degrees from each other respectively. As a result of full-wave rectification, the pulse flow is shifted by 60 degrees respectively.

The full-wave rectifier 120 outputs three voltages of the rectified u, v, w to a single-phase unit 130 at the next stage.

The single-phase unit 130 integrates the full-wave rectified three-phase power rectified by the full-wave rectifier 120 and converts into the single-phase power voltage.

Phase of each three-phase power rectified by a full-wave rectifier 120 has shifted by 120 degrees, and phase of each pulse flow has shifted by 60 degrees after full-wave rectification, and as a result a positive potential is obtained in all the periods. When each three-phase power is superimposed together, a power waveform becomes a continuously connected waveform in which the vicinity of the top of the pulse flow is continuously connected by superimposing.

The waveform 130 of the output stage of the single-phase unit 130 drawn in lower portion FIG. 2 is a power waveform in which the vicinity of the top of the continuous pulse flow is continuously connected, and its output is approximately 100V.

The single-phase unit 130 outputs the voltage obtained by superimposing to the single-phase power supply unit 140 at the next stage.

The single-phase power supply unit 140 supplies power of the single-phase unit 130 as a power source to each LED lighting device in the large-scale LED lighting device assembly 200.

In this example, the output of the single-phase power supply unit 140 is 100V, with a potential difference of 0V against the power of the single-phase unit 130 supplied as a drive power source.

According to the artificial lighting device 100 of Embodiment 1, as shown in FIG. 1, the single-phase power supply unit 140 forms a feedback loop between the input stage of a large-scale LED lighting device assembly 200 and the input division unit 110 and forms a feedback loop between an output of the single-phase unit 130 and the input division unit 110.

Since the full-wave rectifier 120 is a rectifier circuit that employs diode devices, the full-wave rectifier 120 becomes a noise source for generating a harmonic. The harmonic generated by the full-wave rectifier 120 is reflected toward the input stage. Therefore, noise is mixed into the commercial power supply 300 via the input division section 110. In addition, in this configuration shown above, a feedback loop from the input stage of the input division unit 110 to a large-scale LED lighting device assembly 200 is formed. Therefore, a feedback current is generated by this feedback loop as shown in FIG. 3.

Next, a feature in which the large-scale LED lighting device assembly 200 as a whole works as a pseudo LC filter is described below. A large number of LED lighting devices exist in the large-scale LED lighting device assembly 200, and as a result, a large number of LED elements are used. In this example, each LED element included in the LED lighting device is driven at about 3V. The LED element is often driven in a range of about 2.5V to 5V depending on the LED element type. A voltage applied to the LED lighting device may be adjusted to the suitable driving voltage for the applied LED element.

At the designing stage, an inductance component and a capacitance component in each LED element in one LED lighting device can be ignored because the inductance component and the capacitance component are very small. Even if there is only a small inductance component or a capacitance component that can be neglected, when the number of LED elements in a large-scale LED lighting device assembly 200 becomes large and an inductance component and a capacitance component are accumulated as a whole, it can work as a pseudo LC filter.

It is possible to utilize an inductance component and a capacitance component that are accumulated and integrated as a whole in a large-scale LED lighting device assembly 200 as a pseudo LC filter.

In the configuration of the Embodiment 1, as shown in FIG. 3, a feedback loop from an input stage of an input division part 110 to a large-scale LED lighting device assembly 200 is formed as described above, and a harmonic that becomes noise through the feedback loop is suppressed by the pseudo LC filter formed in a large-scale LED lighting device assembly 200. Therefore, the frequency components of the inductance component and the capacitance component generated in a large-scale LED lighting device assembly 200 are diverse, and the LC filter acting on the fifth order harmonic component, the seventh order harmonic component, and the higher harmonic component may be present.

In the above configuration example, a feedback loop is formed between the input stage of the input division unit 110 and the large-scale LED lighting device assembly 200. Another configuration may be possible in which a feedback loop may be formed between the input stage of the full-wave rectifier 120 and the large-scale LED lighting device assembly 200.

Further, when the harmonic component is suppressed in this way, both the voltage waveform and the current waveform of the input division section 110 approach a sine wave, and the effect of improving the power factor can also be obtained.

As described above, according to the artificial lighting device 100 according to Embodiment 1, noise generation and harmonic generation of the artificial lighting device 100 can be suppressed as a whole, and the power factor can be improved.

According to the artificial lighting device 100 of Embodiment 1, there is no switching element and no countermeasure for a high-performance power supply such as a stabilization device is applied. However, the voltage quality is adjusted in the actual use level by the single-phase unit 130.

As a result, reduction of the number of parts, cost and scale in the artificial lighting device 100 can be achieved.

Embodiment 2

An artificial lighting device 100a according to Embodiment 2 is described.

Figure 4:
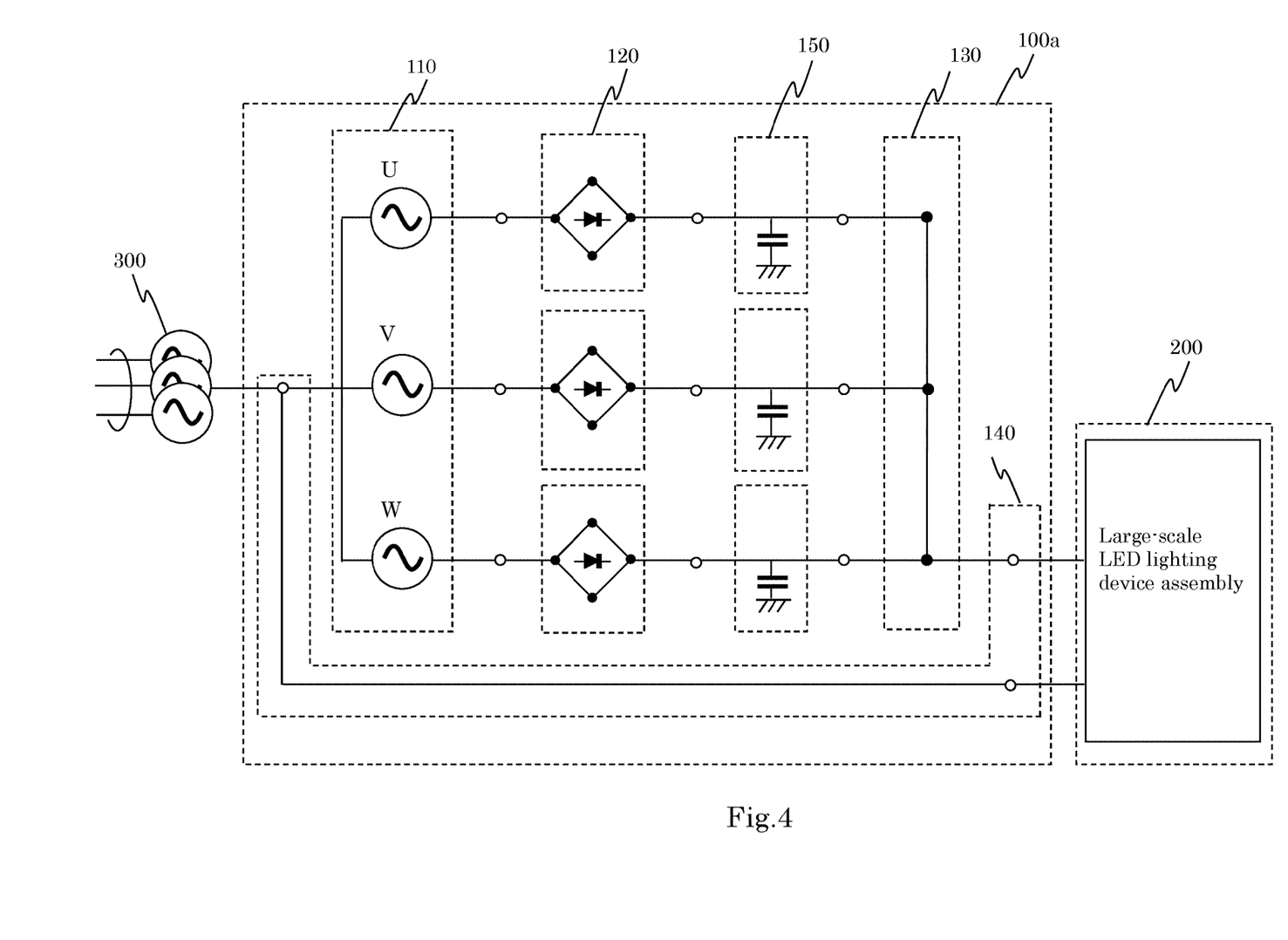
FIG. 4 is a schematic view of the structure of the artificial lighting device 100a of the Embodiment 2.

The configuration of the artificial lighting device 100a of Embodiment 2 employs a smoothing capacitor 150 added at the output stage of the full-wave rectifier 120 in that of Embodiment 1.

FIG. 4 is a schematic view of the structure of the artificial lighting device 100a of the Embodiment 2. As shown in FIG. 4, an artificial lighting device 100a according to Embodiment 2 comprises an input division unit 110, a transformer 120, a full-wave rectifier 120, a single-phase unit 130, a single-phase power supply unit 140, and a smoothing capacitor 150. It can be understood that no switching power source is employed.

It is understood from comparing FIG. 1 and FIG. 4, that the configuration of the artificial lighting device 100a of Embodiment 2 employs a smoothing capacitor 150 added at the output stage of the full-wave rectifier 120 of Embodiment 1.

As described above, the configuration shown in Embodiment 2 includes a smoothing capacitor 150 provided after the full-wave rectifier 120, and the ripple in the power waveform is suppressed by the smoothing capacitor 150. There may be demerits such as an inrush current occurring, the number of components increases and the cost increases in the case of employing the smoothing capacitor 150. However, there is a merit that the ripple in the power waveform is suppressed and the power supply is easily stabilized.

Figure 5:
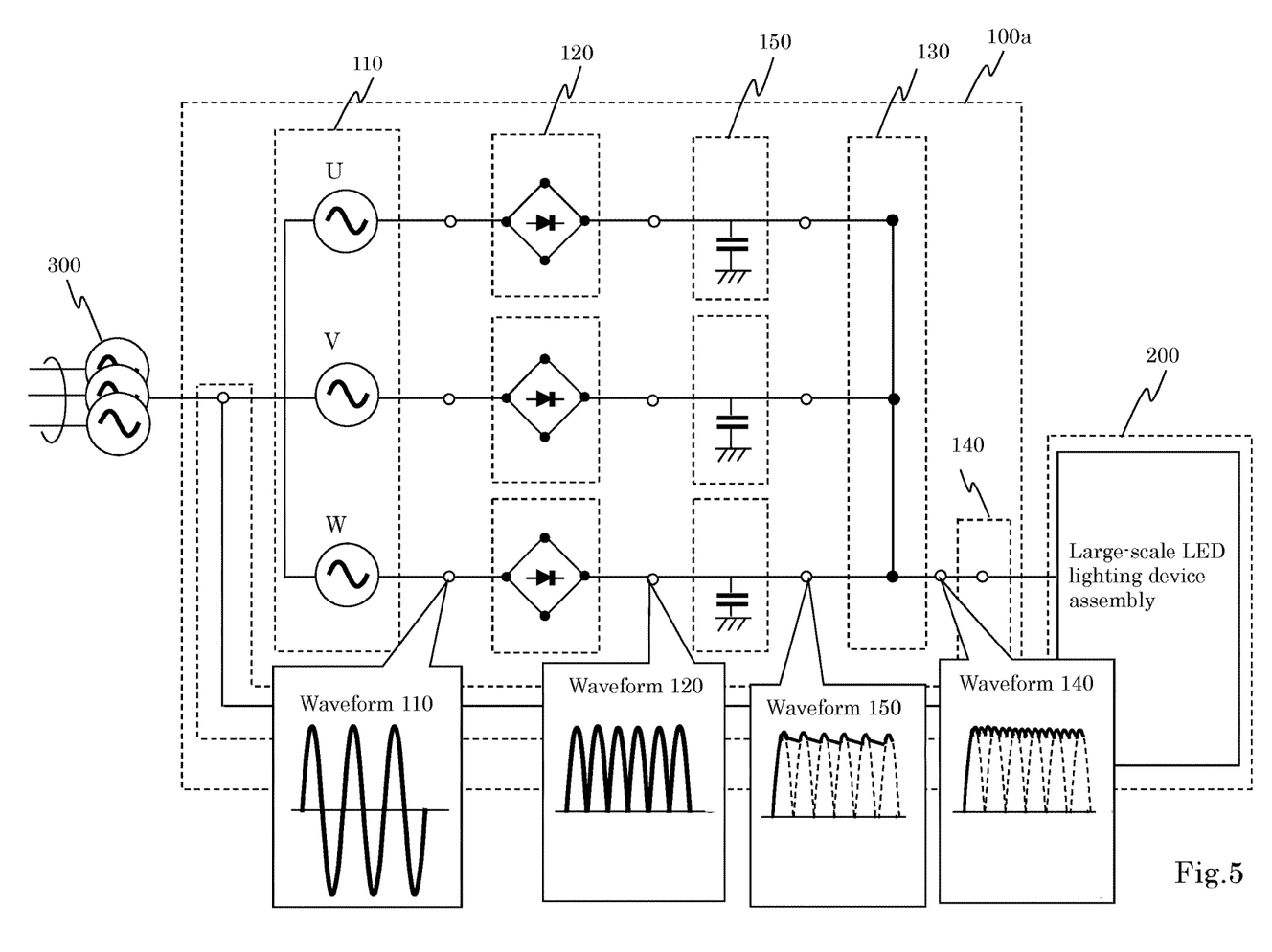
FIG. 5 is a schematic view showing input and output waveforms of the respective portions in the circuit shown in FIG. 4.

As shown in FIG. 5, the waveform 150 is smoothed by the smoothing capacitor 150, then the single-phase unit 130 integrates three-phase power smoothed by the smoothing capacitor 150 and converts into the single-phase power voltage waveform 130.

In the artificial lighting device 100a according to Embodiment 2, a single-phase power supply unit 140 outputs the power supply to the single-phase unit 130 and provides a feedback loop between the large-scale LED lighting device assembly 200 and the input stage of the input division unit 110.

The artificial lighting device 100a of Embodiment 2 employs a smoothing capacitor 150 at the output stage of the full-wave rectifier 120. However, the full-wave rectifier 120 is the generation source of harmonics generated by the full-wave rectifier 120 reflecting toward the input stage and noise is mixed into the commercial power supply 300 via the input division section 110 as described in Embodiment 1.

Figure 6:
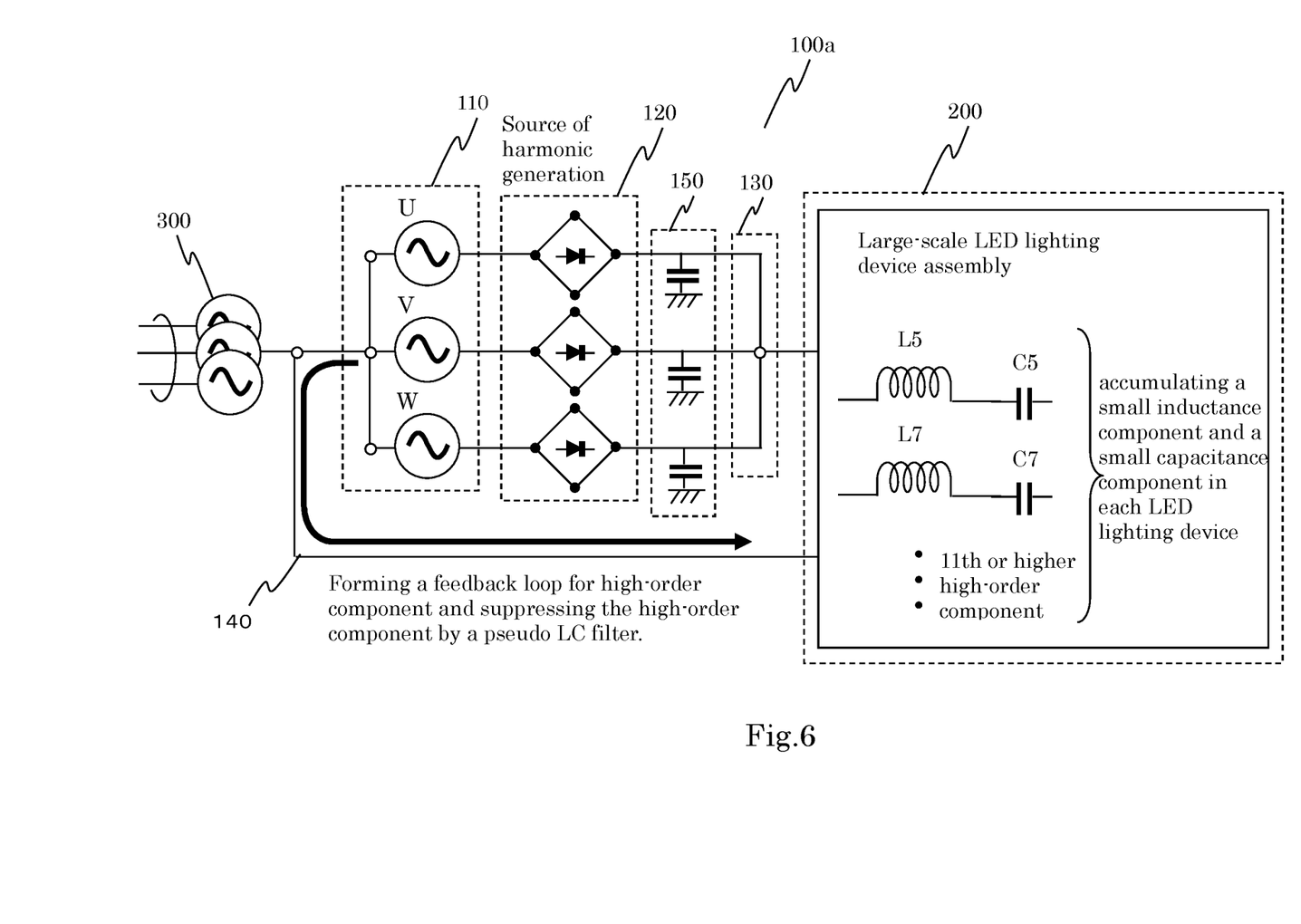
FIG. 6 is a schematic view showing a feedback current by a feedback loop in the configuration of the Embodiment 2.

Thus, in the configuration of this Embodiment 2, a feedback loop is formed between the input stage of the input division unit 110 to the large-scale LED lighting device assembly 200 as shown in FIG. 6.

In this Embodiment 2, the entire large-scale LED lighting device assembly 200 can work as a pseudo LC filter the same as Embodiment 1. At the designing stage, an inductance component and a capacitance component in each LED element in one LED lighting device can be ignored because the inductance component and the capacitance component are very small. Even if there is only a small inductance component or a capacitance component that can be neglected, when the number of LED elements in a large-scale LED lighting device assembly 200 becomes large and an inductance component and a capacitance component are accumulated as a whole, it can work as a pseudo LC filter. Here, an inductance component and a capacitance component integrated in a large scale in a large-scale LED lighting device assembly 200 are used as a pseudo LC filter.

As described above, in the configuration of Embodiment 2, a feedback loop between the input stage of an input division part 110 and the large-scale LED lighting device assembly 200 is formed, and a harmonic which becomes noise through the feedback loop is suppressed by a pseudo LC filter formed on a large-scale LED lighting device assembly 200.

In the above configuration example, a feedback loop between the input stage of the input division unit 110 and the large-scale LED lighting device assembly 200 is formed. However, a feedback loop may be formed between the input stage of the full-wave rectifier 120 and the large-scale LED lighting device assembly 200 instead.

Further, when the harmonic component is suppressed in this way, both the voltage waveform and the current waveform of the input division section 110 become near to the sine wave, and the effect of improving the power factor can also be obtained.

Thus, noise reduction, harmonic suppression, and power factor improvement can be performed without installing any extra electronic circuit as a special harmonic countermeasure.

For example, the artificial lighting device shown in examples 1 to 2 can be introduced to a general factory or an office such as a plant factory. When used as a light source for a plant factory, it is preferable to provide an LED lighting control device for controlling so that the LED element is turned on in a time period simulating the daytime and the LED element is turned off in a time period simulating the night.

While some preferable embodiments of the sample storage according to the present invention are described above, it should be understood that various changes are possible, without deviating from the technical scope according to the present invention.

DESCRIPTION OF THE REFERENCE NUMERALS 100, 100a: Artificial lighting device
110: Input division unit
120: Full-wave rectifier
130: Single-phase unit
140: Single-phase power supply unit
150: Smoothing capacitor
200: Large-scale LED lighting device assembly.
300: Commercial three-phase AC power supply

The invention claimed is:
1. An artificial lighting device applied to a plant factory comprising;
an LED lighting device having a plurality of LED elements,
an input division unit for dividing three-phase power supplied from a three-phase AC power supply into each of a U, V, and W input power source,
a full-wave rectifier for performing full-wave rectification for each input power source divided by the input division unit,
a single-phase unit for superimposing each full-wave rectified output by the full-wave rectifiers as a single-phase power source for the LED lighting device, a loop circuit for feeding back from the LED lighting device assembly to the input stage of the input division part or the full-wave rectifier, wherein the LED lighting device assembly is a large-scale LED lighting device assembly, and a small inductance component and a small capacitance component in each LED lighting device are accumulated to work as a pseudo LC filter by the large-scale LED lighting device assembly as a whole.

2. An artificial lighting device according to claim 1, wherein no switching power source is employed in an input stage or an output stage of the input division unit.

3. An artificial lighting device according to claim 1, wherein a smoothing capacitor is employed at the output stage of the full-wave rectifier and at the input stage of the single-phase unit.

4. An artificial lighting device according to claim 1, wherein a LED lighting device controller is employed for controlling the lighting of the LED element to be turned on in a time period simulating daytime, and to be turned off in a time period simulating night.

5. A plant factory in which the artificial lighting device according to claim 1 is applied.

6. A power supply control method of an artificial lighting device applied to a plant factory in which an LED lighting device having a plurality of LED elements is arranged, comprising, dividing three-phase power supplied from a three-phase AC power supply into each of U, V, W input power source by a dividing unit, full-wave rectifying of each divided input power source by a full-wave rectifier, superimposing each full-wave rectified output as a single-phase power source for the LED lighting device by a single-phase unit, and feeding back from the LED lighting device assembly to the input stage of the dividing unit or the full-wave rectifier, wherein the LED lighting device assembly is a large-scale LED lighting device assembly, obtaining enough inductance components and capacitance components to work as a pseudo LC filter for the large-scale LED lighting device assembly as a whole by accumulating a small inductance component and a small capacitance component in each LED lighting device.

\* \* \* \* \*